United States Patent
Himawan (10) Patent No.: US 9,055,036 B2
(45) Date of Patent: Jun. 9, 2015

(54) METHOD AND APPARATUS FOR TRANSMITTING A USER DATAGRAM PROTOCOL MESSAGE THAT IS LARGER THAN A DEFINED SIZE

(71) Applicant: Motorola Solutions, Inc., Schaumburg, IL (US)

(72) Inventor: Erwin Himawan, Chicago, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 123 days.

(21) Appl. No.: 13/780,378

(22) Filed: Feb. 28, 2013

(65) Prior Publication Data
US 2014/0245453 A1    Aug. 28, 2014

(51) Int. Cl.
*H04L 29/00*    (2006.01)
*H04L 29/06*    (2006.01)

(52) U.S. Cl.
CPC .................................. *H04L 63/0428* (2013.01)

(58) Field of Classification Search
None
See application file for complete search history.

(56) References Cited

U.S. PATENT DOCUMENTS

| 7,035,652 | B1 | 4/2006 | Keller | |
|---|---|---|---|---|
| 7,613,109 | B2 | 11/2009 | Jha et al. | |
| 7,738,495 | B2 * | 6/2010 | Dalal et al. | 370/476 |
| 7,804,780 | B2 | 9/2010 | Baratakke et al. | |
| 8,140,687 | B2 | 3/2012 | Roy et al. | |
| 8,683,572 | B1 * | 3/2014 | Mahalingaiah | 726/10 |
| 2006/0218390 | A1 * | 9/2006 | Loughran et al. | 713/151 |
| 2012/0008644 | A1 | 1/2012 | Kure | |

FOREIGN PATENT DOCUMENTS

WO    95/00421 A1    2/1995

* cited by examiner

*Primary Examiner* — Jeffrey Pwu
*Assistant Examiner* — Halai Salehi
(74) *Attorney, Agent, or Firm* — Steven A. May (57) ABSTRACT

A first device initiates a handshake message exchange with a second device according to a security protocol. The first device determines that an application datagram is to be transmitted according to a first transport protocol that limits a size of a datagram based on a defined size. The first device also determines that an application datagram size is larger than the defined size. The first device fragments the application datagram if the application datagram size is larger than the defined size and secures the application datagram with the security protocol. The first device also encapsulates the application datagram fragments in handshake messages, wherein an encapsulated application datagram fragment is transmitted from the first device to the second device in a first security protocol record. The first device may also transmit, to the second device, another application datagram secured with the security protocol.

13 Claims, 4 Drawing Sheets

METHOD AND APPARATUS FOR TRANSMITTING A USER DATAGRAM PROTOCOL MESSAGE THAT IS LARGER THAN A DEFINED SIZE

FIELD OF THE DISCLOSURE

The present disclosure relates generally to reliably and securely transmitting a User Datagram Protocol (UDP) datagram with a Datagram Transport Layer Security (DTLS) protocol, and more particularly, to transmitting a UDP datagram that is larger than a defined size, without switching to another transport or security protocol.

BACKGROUND

A communication device, for example, a mobile device such as a laptop or tablet or a stationary device such as a desktop or a gaming console, can send one or more packets (also referred to as datagrams) on an Internet Protocol (IP) network using a connectionless transport protocol, such as User Datagram Protocol (UDP). UDP does not require that a pre-established connection exist between communication devices and/or that the communication devices maintain a session, making UDP a relatively fast transport protocol. Some application layer protocols, for example Session Initiation Protocol (SIP), and/or applications, such as electronic gaming application, are designed to use UDP because of the transmission speed associated with UDP. However, UDP datagrams are not transmitted in any inherent order as all packets are independent of each other. If an application or protocol using UDP requires that datagrams be sent and received in a specific order, the ordering has to be managed by the transmitting and/or receiving applications/protocols.

The size of a UDP datagram is limited by a Maximum Transmission Unit (MTU), i.e., the largest size of a datagram which may be transferred using a specific data link connection. For Ethernet, the prevalent Path MTU (PTMU) is currently 1500 bytes. If the size of the datagram is larger than the PMTU, before the datagram is transmitted, the transmitting communication device has to fragment the large datagram into two or more datagram fragments, each of which is smaller than the PTMU. The receiving communication device has to reorder and reassemble these datagram fragments to recover the transmitted datagram. During delivery, one or more of the fragmented datagrams may be lost because of, for example, firewall devices between the communicating devices which may increase the likelihood that fragmented packets are dropped or blocked. Although UDP provides checksums for data integrity and port numbers for addressing different functions at the source and/or destination applications, UDP provides no guarantee of delivery, is not concerned with the order in which the datagrams are delivered, and does not provide for duplicate protection. Thus, if any of these fragments are not received by the receiving device, the transmitting device needs to retransmit the whole datagram. However, certain applications/protocols, for example SIP, do not support fragmentation, reassembly, retransmission, and reordering of fragmented datagrams.

To secure network traffic sent from one communication device to another, and prevent eavesdropping, tampering, or message forgery, the network traffic being sent may be secured by a security protocol, such as a Datagram Transport Layer Security (DTLS) protocol or a Transport Layer Security (TLS) protocol. DTLS is used to provide privacy for UDP datagrams. DTLS also does not guarantee message delivery and does not provide a message fragmentation, retransmission, and reassembly mechanism. Therefore, in order for a transmitting application on an IP network to send a datagram that is larger than the size of the PTMU, the transmitting application has to implement its own message fragmentation, reordering, and reassembly mechanisms, or use a transport protocol (for example, Transmission Control Protocol (TCP) or Stream Control Transmission Protocol (SCTP)) which supports message fragmentation. However, certain computing platforms do not support SCTP and for performance reason, some applications cannot use TCP.

TCP is connection oriented protocol, wherein a connection has to be established between two communication devices before data can be transmitted between the communication devices. Once the connection is established, bidirectional data may be sent between the communication devices. TCP is used in case of non-time critical applications and arranges data packets in the order specified by the transmitting communication device. With TCP, there is an absolute guarantee that the data is transmitted intact and that the data arrives in the same order in which it was sent. TLS may be used to provide security for the TCP packet.

Because TCP transmission is slower than UDP transmission, for performance reasons, changing from UDP/DTLS to TCP/TLS may not be desirable. However, there are times when a UDP message size that is larger than the PTMU needs to be delivered and the transmitting application or protocol cannot fragment the message. For example, during a SIP registration, the SIP message might include a Security Assertion Markup Language (SAML) token. The inclusion of the token inside SIP message may increase the size of the message such that the SIP message may be larger than the PMTU. Because SIP with UDP does not handle fragmentation, the transmitting application must use TCP/TLS to handle this specific case. Although TCP provides reliable, ordered delivery of streams of data, TCP may not be preferred for an application that may need to intermittently transmit a datagram that is larger than the PTMU, but that prefers reduced latency over reliability.

Accordingly, there is a need for a method and apparatus for transmitting a UDP datagram that is larger than a defined size, without switching to another transport or security protocol.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to apparatuses and methods for transmitting an application datagram that is larger than a defined size reliably and securely with a security protocol, without relying on a protocol from another network layer to perform message fragmentation, reassembly, and guaranteed delivery. The application datagram may be, for example a User Datagram Protocol (UDP) application datagram, and the security protocol may be, for example, a Datagram Transport Layer Security (DTLS) protocol. A first device initiates a session management (handshake) message exchange with a second device according to the security protocol. The first device determines that an application datagram is to be transmitted according to a first transport protocol, for example the UDP protocol, that limits a size of a datagram based on a defined size. The first device also determines that the application datagram size is larger than the defined size. The first device fragments the application datagram into application data fragments, if the application datagram size is determined to be larger than the defined size. The first device also secures the application datagram with the security protocol and encapsulates the application datagram fragments in handshake messages, wherein an encapsulated application data fragment is transmitted from the first device to the second device in a first security protocol record. The first device may also transmit, to the second device, another application datagram secured with the security protocol in a subsequent security protocol record.

Figure 1:
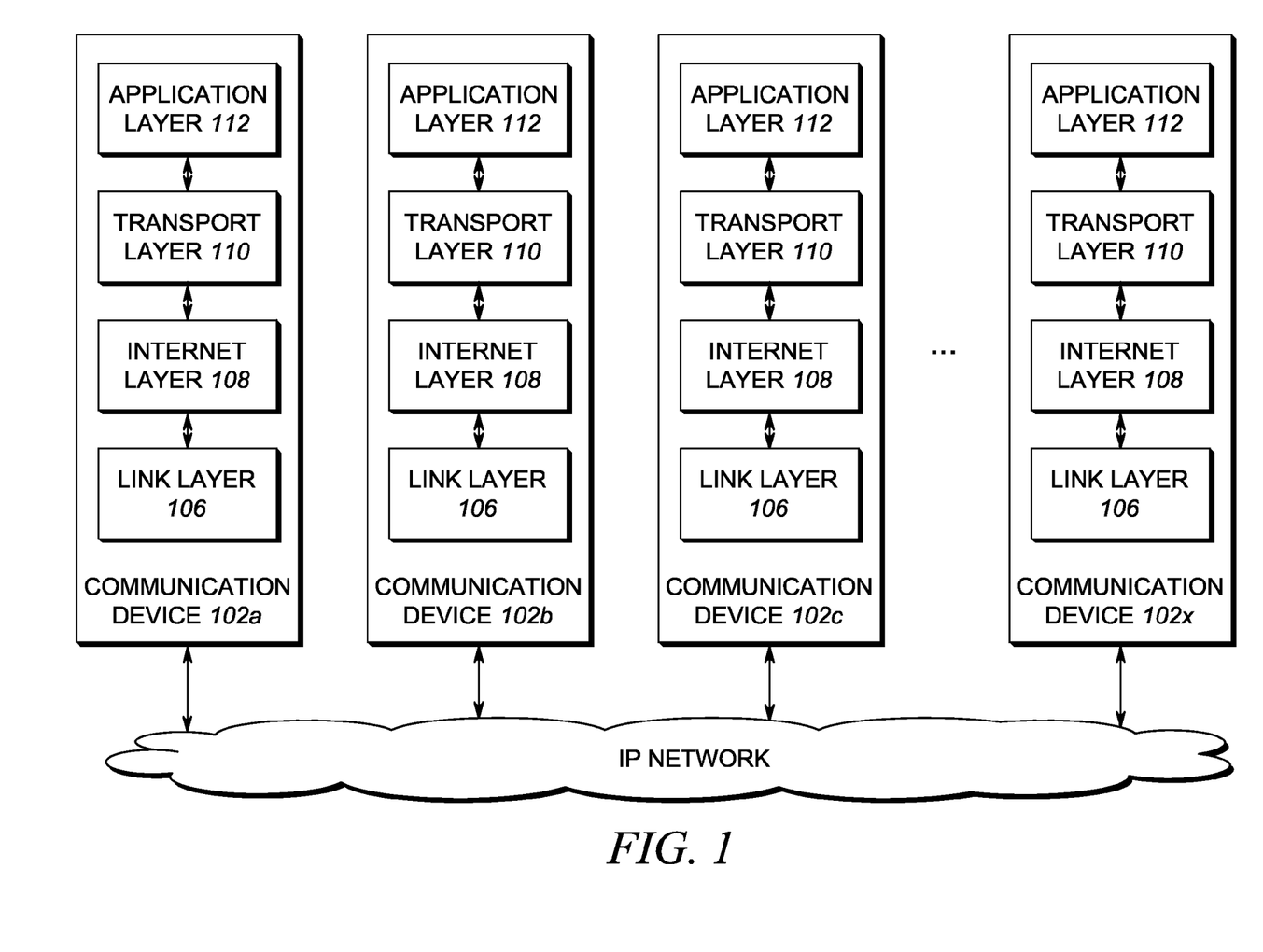
FIG. 1 is a block diagram of a network used in accordance with some embodiments.

FIG. 1 is a block diagram of a network used in accordance with some embodiments. Network 100 includes multiple communication devices 102 (that is, communication devices 102a-102x) (also referred to herein as hosts) that communicate with each other via interconnected computer networks 104. Communication devices 102 may use different Internet Protocols (IP) at different layers of abstraction, each protocol being used to specify how data should be formatted, addressed, transmitted, and received at each layer. In some embodiments, data flows between communication devices 102 are processed at four abstraction layers 106-112, each with its own protocols. As used herein, communication device refers to any device capable of exchanging data with another communication device, for example, a user device, for example, a mobile station such as a cellular telephone, a radio telephone, a smartphone, a personal digital assistant (PDA), a laptop computer, or a tablet computer, or a personal computer, or a network device, such as a network server.

Protocols at the lowest layer of abstraction, the link layer 106, describe the local network topology and the interfaces needed to transmit Internet layer datagrams or packets to next-neighbor communication devices. Protocols at the next layer of abstraction, the network or internet layer 108 (for example, implementing the Internet Protocol (IP)), establish internetworking by describing how datagrams are exchanged across network boundaries. Protocols at the next layer of abstraction, the transport layer 110, handle device-to-device communication and provide a uniform networking interface that hides the actual topology (layout) of the underlying network connections. Transmission Control Protocol (TCP), User Datagram Protocol (UDP), and Stream Control Transmission protocol (SCTP) are examples of protocols used at transport layer 110. The highest layer of abstraction, the application layer 112, includes all protocols that allow applications on each communication device 102 to create user data and communicate the user data to other applications on another or the same communication device. Hypertext Transfer Protocol (HTTP), File transfer protocol (FTP), Session Initiation Protocol (SIP), Simple Mail Transfer Protocol (SMTP), Lightweight Directory Access Protocol (LDAP), and Internet Message Access Protocol (IMAP) are examples of protocols used at application layer 112.

Communication devices 102 using UDP at transport layer 110 to send datagrams across computer network 104 may secure the UDP datagrams with a Datagram Transport Layer Security (DTLS) protocol. DTLS is designed to secure data between applications on communication devices 102, without compensating for lost or re-ordered data traffic. Some embodiments are directed to transmitting a UDP application datagram that is larger than a defined size reliably and securely with a DTLS security protocol, without relying on an upper layer protocol (for example, session, presentation layer, or application layer protocols), a network layer protocol (for example, Internet Protocol), and a link layer protocol to perform message fragmentation, reassembly, and to guarantee delivery.

DTLS uses cryptographic methods to encrypt and protect the integrity of the data at the transport layer 110 end-to-end and operates at the application layer 112. DTLS secures the user data before sending it to the transport layer 110. Before data secured with DTLS is sent from a transmitting communication device (also referred to as a client) to a receiving communication device (also referred to as a server) a session management message exchange (also referred to as a "handshake") occurs between a DTLS client and a DTLS server. During the handshake, the client sends an "introduction" or a "Client Hello" message to the server, the server responds with a "Server Hello" message, and the client and server discover each other's capabilities and negotiate cryptographic attributes.

Transmission of DTLS handshake messages uses a simple retransmission timer to handle packet loss. When, for example, communication device 102a wants to send a datagram to, for example, communication device 102b, communication device 102a sends a "Client Hello" handshake message to communication device 102b. Communication device 102a expects to receive a "Server Hello" response message from communication device 102b. If communication device 102a does not receive the response within a predefined time, communication device 102a knows that either the "Client Hello" handshake message or the response has been lost and retransmits the "Client Hello" handshake message. Communication device 102b transmits a response to each received "Client Hello" handshake message. Included in the "Client Hello" and "Server Hello" messages are the DTLS client and server supported capabilities and cryptographic attributes. Examples of cryptographic attributes are a key exchange algorithm, a bulk encryption algorithm, a message authentication code, algorithm and pseudorandom function. Thereafter, communication devices 102a and 102b perform authentication, cryptographic attributes negotiations and key exchange. Each handshake message sent from or to communication devices 102a and 102b is assigned a specific sequence number within that handshake. Accordingly, when communication device 102b receives a handshake message from communication device 102a, communication device 102b can determine that the message is the next message it expects and process the message. If the next message received by communication device 102b has a sequence number greater than the message it is currently processing, communication device 102b queues the message in the correct sequence for future handling. On the other hand, if the next message received by communication device 102b has a sequence number less than the message it is currently processing, communication device 102b silently drops the message and flags the message as replay or duplicate. Communication device 102b may choose to continue or terminate the handshake procedure.

DTLS handshake messages may be larger than Path Maximum Transmission Unit (PMTU), i.e., the largest size of an IP datagram which may be transferred using a specific data link connection, for example 1500 bytes for Ethernet link. To overcome the size limitation of the PMTU, each DTLS handshake message may be fragmented over several DTLS records, each of which fits in a single IP datagram. Each DTLS handshake message also includes both a fragment offset and a fragment length. Therefore, when communication device 102b receives all fragments of a handshake message, it can reassemble the original message.

In order for communication device 102a to intermittently transmit a UDP datagram that is larger than the PTMU, without switching to another transport protocol such as TCP or SCTP, communication device 102a (client) sends a "Client Hello" handshake message that includes an extension for indicating that the client intends to encapsulate application data inside the DTLS handshake message. For example, the "Client Hello" handshake message sent from communication device 102a to communication device 102b (server) may include an "Application Data Tunneling" attribute. If the server can process application data encapsulated in the DTLS handshake message, when the server responds to the client, the server can include an "Application Data Tunneling" attribute in the "Server Hello" handshake message. If the server cannot process application data encapsulated in the DTLS handshake message, the server response will not include the "Application Data Tunneling" attribute. After receiving the "Server Hello" handshake message, with the "Application Data Tunneling" attribute, the client and server perform standard DTLS authentication, cryptographic attributes negotiation and key exchange. Thereafter, if the server indicated that it can support tunneling of application data in a DTLS handshake message, the client tunnels/encapsulates the application data inside the DTLS handshake message and the server responds with an application data acknowledgment for each tunneled application data it receives. On the other hand, if the "Client Hello" or "Server Hello" handshake message does not include the "Application Data Tunneling" attribute, the client and server may choose to perform standard DTLS authentication and proceed without tunneling/encapsulating the application data inside the DTLS handshake message or terminate the handshake procedure.

If the "Server Hello" handshake message includes the "Application Data Tunneling" feature, when the client encapsulates application data in a DTLS handshake message, the client identifies that the DTLS record either includes encapsulated application data or does not include encapsulated application data. For example, the client may include an "Application Tunneling" element in each DTLS record that includes tunneled application data. The "Application Tunneling" element may be used for those messages that are larger than the PTMU. The server may provide an "Application Data Acknowledgment" message to acknowledge each received fragment of application data after the client has tunneled the intermittent datagram that is larger than the PTMU. Thereafter, when the client has to send an application datagram that is smaller than the PTMU, the client identifies the DTLS record with an "Application Data" element to indicate to the server that the application datagram is a standard DTLS application data message. Accordingly, an application using UDP does not need to change, or to simultaneously establish, another transport protocol to send an intermittent datagram that is larger than the PTMU.

Figure 2:
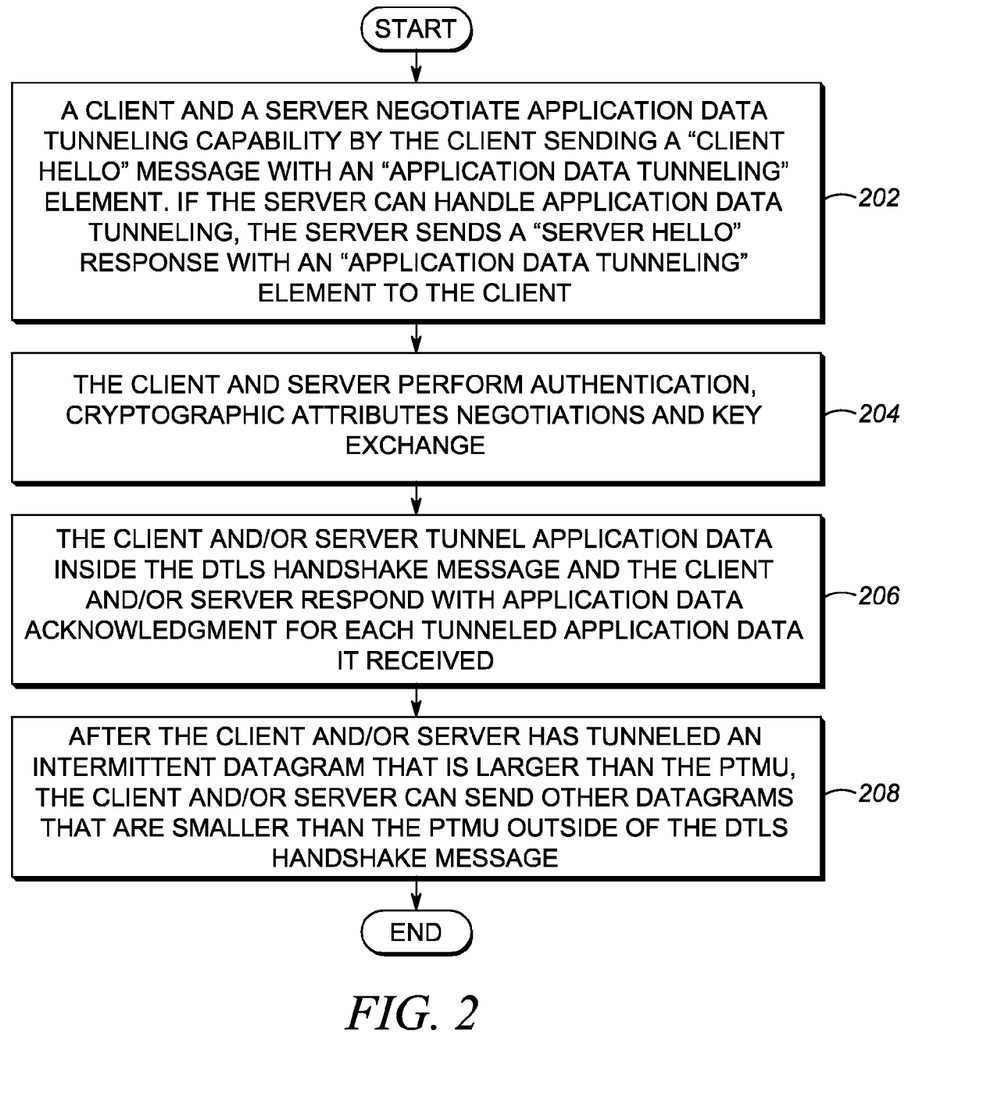
FIG. 2 is a flow diagram for tunneling an intermittent datagram that is larger than a defined size inside a DTLS handshake message in accordance with some embodiments.

FIG. 2 is an overview of a flow diagram for tunneling an intermittent datagram that is larger than a defined size inside a DTLS handshake message in accordance with some embodiments. At 202, a client and a server negotiate application data tunneling capability by the client sending a "Client Hello" message with an "Application Data Tunneling" element. If the server can handle application data tunneling, the server sends a "Server Hello" response with an "Application Data Tunneling" element to the client. At 204, the client and server perform authentication, cryptographic attributes negotiations and key exchange. At 206, the client and/or server tunnel application data inside a DTLS handshake message and the client and/or server respond with an application data acknowledgment for each tunneled application data it received. At 208, after the client and/or server has tunneled an intermittent datagram that is larger than the PTMU, the client and/or server can send other datagrams that are smaller than the PTMU without encapsulating them inside a DTLS handshake message.

Figure 3:
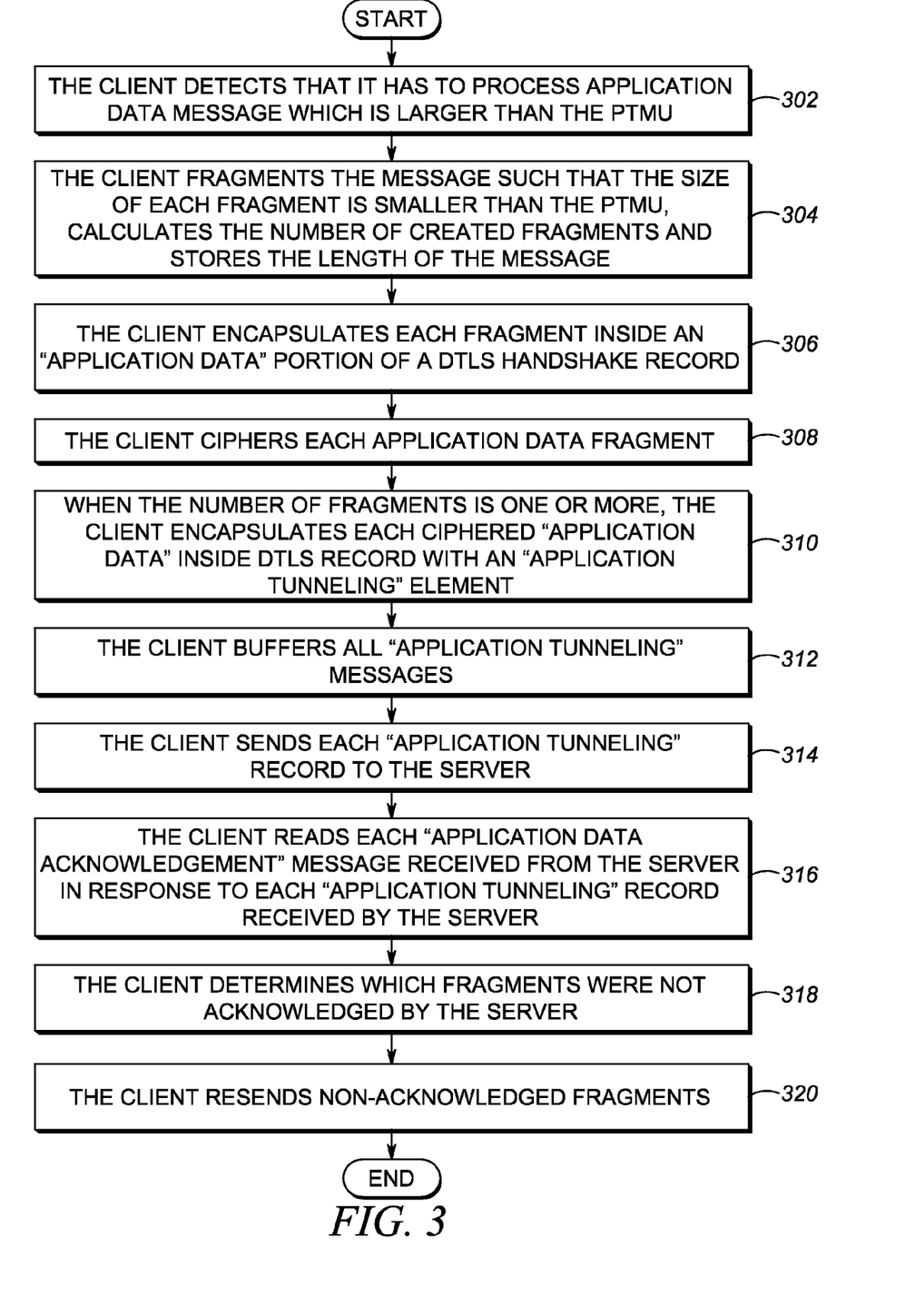
FIG. 3 is a flow diagram for tunneling, at a client, an intermittent datagram that is larger than a defined size inside a DTLS handshake message in accordance with some embodiments.

FIG. 3 is a flow diagram for tunneling, at a client, an intermittent datagram that is larger than a defined size inside a DTLS handshake message in accordance with some embodiments. At 302, the client detects that it has to process an application data message that is larger than the PTMU. At 304, the client fragments the message such that the size of each fragment is smaller than the PTMU, calculates the number of created fragments, and stores the length of the message. At 306, the client encapsulates each fragment inside an "Application Data" portion of a DTLS handshake record. During the encapsulation, the client includes a message sequence number, the length of the message, and an offset associated with the fragment in the "Application Data" header. At 308, the client ciphers each application data fragment. In ciphering the application data fragment, the client encrypts and generates a Message Authentication Code (MAC) using the negotiated cryptographic attributes. At 310, when the number of fragments is one or more, the client encapsulates each ciphered "Application Data" inside a DTLS record with an "Application Tunneling" element. At 312, the client buffers all "Application Tunneling" messages. At 314, the client sends each "Application Tunneling" record to the server. At 316, the client reads each "Application Data Acknowledgement" message received from the server in response to each "Application Tunneling" record sent to, and received by, the server. At 318, the client determines which fragments were not acknowledged by the server. At 320, the client resends non-acknowledged fragments.

Figure 4:
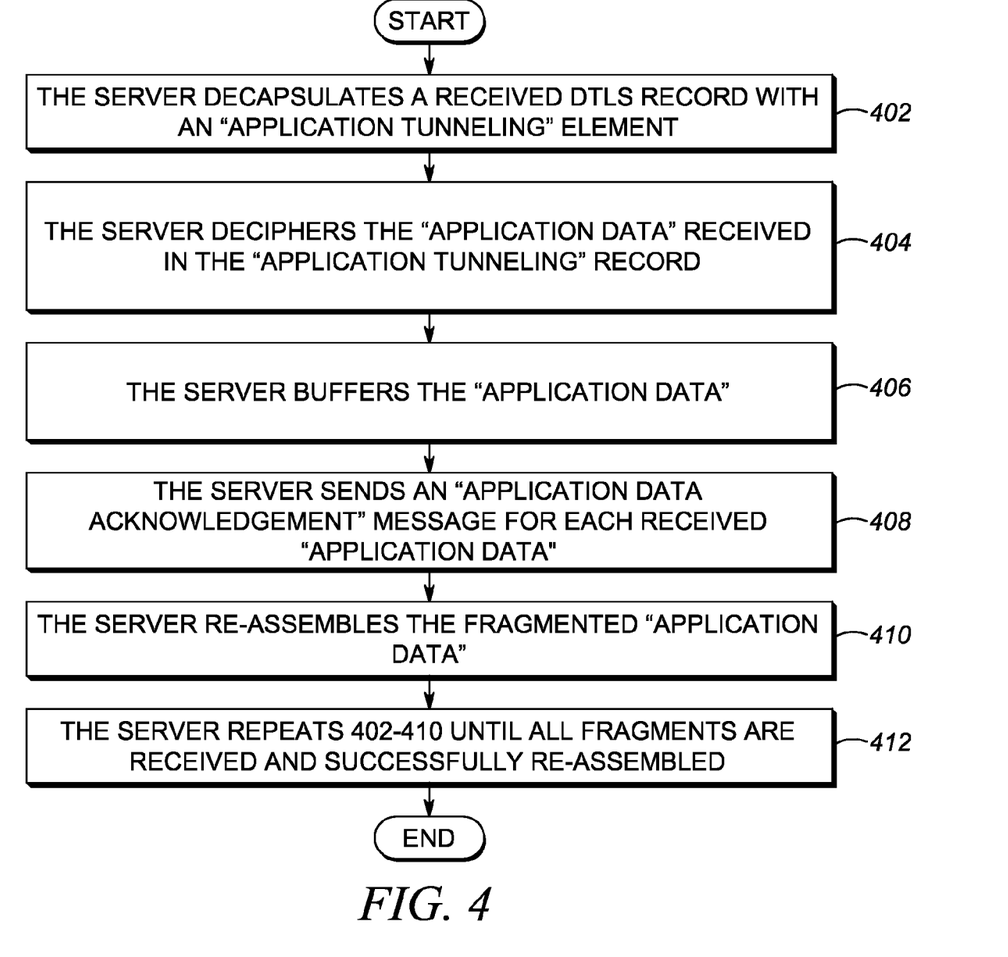
FIG. 4 is a flow diagram for processing, at a server, an intermittent datagram that is larger than a defined size inside a DTLS handshake record in accordance with some embodiments.

FIG. 4 is a flow diagram for processing, at a server, an intermittent datagram that is larger than a defined size inside a DTLS handshake message in accordance with some embodiments. At 402, the server decapsulates a received DTLS record that includes an "Application Tunneling" element. At 404, the server deciphers the "Application Data" received in the "Application Tunneling" record. In deciphering the "Application Data", the server verifies the MAC and decrypts the "Application Data". At 406, the server buffers the "Application Data". At 408, the server sends an "Application Data Acknowledgement" message for each received "Application Data". At 410, the server re-assembles the fragmented "Application Data". At 412, the server repeats 402-410 until all fragments are received and successfully re-assembled.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, each of communication devices 102 of FIG. 1 may comprise a memory device (for example, a volatile or non-volatile computer readable medium) that that stores a set of instructions that, when executed by a processor of the communication device, perform some or all of the steps set forth in FIGS. 2-4 and the corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:
1. A method comprising:
    engaging, by a device, in a Datagram Transport Layer Security (DTLS) handshake message exchange with a second device according to the DTLS protocol;
    determining, at the first device, that an application datagram is to be transmitted according to a User Datagram Protocol (UDP) that limits a size of a datagram based on a Maximum Transmission Unit (MTU), wherein the first device determines that a size of the application datagram is larger than the MTU;
    fragmenting, at the first device, the application datagram into application data fragments, if the application datagram size is determined to be larger than the MTU;
    fragmenting, at the first device, the DTLS handshake message such that a size of a first DTLS protocol record is smaller than the MTU, and providing a fragment offset and length for each first DTLS protocol record created from the fragmented DTLS handshake message so that the second device can reassemble the DTLS handshake message;
    securing, at the first device, the application datagram with the DTLS protocol;
    encapsulating, by the first device, the application data fragments in DTLS handshake messages, wherein an encapsulated application data fragment is transmitted from the first device to the second device in the first DTLS protocol record; and transmitting, by the first device to the second device, another application datagram secured with the DTLS protocol in a subsequent DTLS protocol record.

2. The method of claim 1, wherein the engaging in a DTLS handshake message exchange comprises sending, by the first device, an introduction message that includes an element for indicating that the first device is capable of transmitting application data inside the DTLS handshake message of the first DTLS protocol record, and receiving a response to the introduction message that includes an element for indicating whether the second device can process the application data inside the DTLS handshake message of the first DTLS protocol record.

3. The method of claim 1, further comprising performing authentication, cryptographic attributes negotiations, and key exchange during the DTLS handshake message exchange between the first device and the second device.

4. The method of claim 1, wherein the encapsulating comprises adding a tunneling element to each first DTLS protocol record to indicate to the second device that the first DTLS protocol record includes the encapsulated application datagram.

5. The method of claim 1, wherein the transmitting comprises adding a non-tunneling element to the subsequent DTLS protocol record to indicate to the second device that the subsequent DTLS protocol record does not includes the encapsulated application datagram.

6. The method of claim 1, further comprising receiving, at the first device, an acknowledgment for each fragment of the DTLS handshake message received by the second device and resending un-acknowledgment fragments.

7. The method of claim 1, wherein responsive to receiving a response associated the first DTLS protocol record, the second device decapsulates the first DTLS protocol record, deciphers the application datagram, and reassembles the application datagram.

8. A communication device comprising:
a processor configured to:
engage in a DTLS handshake message exchange with another communication device according to a DTLS protocol;
determine that an application datagram is to be transmitted according to a User Datagram Protocol (UDP) that limits a size of a datagram based on a Maximum Transmission Unit (MTU), wherein the application datagram size is determined to be larger than the MTU;
fragment the application datagram into application data fragments if the application datagram size is determined to be larger than the MTU;
fragment the DTLS handshake message such that the size of a first DTLS protocol record is smaller than the MTU, and provide a fragment offset and length for each first DTLS protocol record so that the second device can reassemble the DTLS handshake message;
secure the application datagram with the Datagram Transport Layer Security (DTLS) protocol;
encapsulate the application data fragments in DTLS handshake messages, wherein an encapsulated application data fragment is transmitted to the second device in the first DTLS protocol record; and
transmit, to the second device, another application datagram secured with the DTLS protocol in a subsequent DTLS protocol record.

9. The communication device of claim 8, wherein the processor is configured to engage in a DTLS handshake message exchange by sending an introduction message that includes an element for indicating that the communication device is capable of transmitting application data inside the DTLS handshake message of the first DTLS protocol record, and, in response, receive a response to the introduction message that includes an element for indicating whether the another communication device can process the application data inside the DTLS handshake message of the first DTLS protocol record.

10. The communication device of claim 8, wherein the processor further is configured to perform authentication, cryptographic attributes negotiations, and key exchange during the DTLS handshake message exchange between the first device and the second device.

11. The communication device of claim 8, wherein the processor is configured to add a tunneling element to each first DTLS protocol record to indicate to the second device that the first DTLS protocol record includes the encapsulated application datagram.

12. The communication device of claim 8, wherein the processor is configured to add a non-tunneling element to the subsequent DTLS protocol record to indicate to the second device that the subsequent DTLS protocol record does not includes the encapsulated application datagram.

13. The communication device of claim 8, wherein the processor is configured to receive an acknowledgment for each fragment of the DTLS handshake message received by the second device and resend un-acknowledgment fragments.

* * * * *

UNITED STATES PATENT AND TRADEMARK OFFICE
CERTIFICATE OF CORRECTION

| | | |
|---|---|---|
| PATENT NO. | : 9,055,036 B2 | |
| APPLICATION NO. | : 13/780378 | |
| DATED | : June 9, 2015 | |
| INVENTOR(S) | : Erwin Himawan | |

It is certified that error appears in the above-identified patent and that said Letters Patent is hereby corrected as shown below:

IN THE TITLE PAGE:

Under "Assistant Examiner," in Column 2, Line 1, delete "Halai" and insert -- Helai --, therefor.

IN THE DRAWINGS:

In FIG. 2, Sheet 2 of 4, for Tag "208", in Line 2, delete "PTMU," and insert -- PMTU, --, therefor.

In FIG. 2, Sheet 2 of 4, for Tag "208", in Line 4, delete "PTMU" and insert -- PMTU --, therefor.

In FIG. 3, Sheet 3 of 4, for Tag "302", in Line 2, delete "PTMU" and insert -- PMTU --, therefor.

In FIG. 3, Sheet 3 of 4, for Tag "304", in Line 2, delete "PTMU," and insert -- PMTU, --, therefor.

IN THE SPECIFICATION:

In Column 1, Line 38, delete "(PTMU)" and insert -- (PMTU) --, therefor.

In Column 1, Line 43, delete "PTMU." and insert -- PMTU. --, therefor.

In Column 2, Line 3, delete "PTMU," and insert -- PMTU, --, therefor.

In Column 2, Line 25, delete "PTMU" and insert -- PMTU --, therefor.

In Column 2, Line 37, delete "PTMU," and insert -- PMTU, --, therefor.

In Column 5, Line 27, delete "PTMU," and insert -- PMTU, --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,055,036 B2

IN THE SPECIFICATION:

In Column 5, Line 67, delete "PTMU." and insert -- PMTU. --, therefor.

In Column 6, Line 3, delete "PTMU." and insert -- PMTU. --, therefor.

In Column 6, Line 5, delete "PTMU," and insert -- PMTU, --, therefor.

In Column 6, Line 11, delete "PTMU." and insert -- PMTU. --, therefor.

In Column 6, Line 27, delete "PTMU," and insert -- PMTU, --, therefor.

In Column 6, Line 29, delete "PTMU" and insert -- PMTU --, therefor.

In Column 6, Line 35, delete "PTMU." and insert -- PMTU. --, therefor.

In Column 6, Line 37, delete "PTMU," and insert -- PMTU, --, therefor.

In Column 6, Lines 65-66, delete "dechipering" and insert -- deciphering --, therefor.

IN THE CLAIMS:

In Claim 10, Column 10, Line 28, delete "further is" and insert -- is further --, therefor.